Jan. 17, 1928. 1,656,782

T. EFSTATHIOU

COOLING AND DISPENSING DEVICE

Filed Feb. 28, 1927

Theofanis Efstathiou INVENTOR

BY Victor J. Evans

ATTORNEY

WITNESS:

Patented Jan. 17, 1928.

1,656,782

UNITED STATES PATENT OFFICE.

THEOFANIS EFSTATHIOU, OF ASTORIA, NEW YORK.

COOLING AND DISPENSING DEVICE.

Application filed February 28, 1927. Serial No. 171,659.

This invention relates to means for cooling and dispensing liquids and is an improvement upon a device for this purpose disclosed in Patent No. 1,594,248, granted to me July 27, 1926.

An object of the present invention is to provide means for agitating liquid within a container so as to keep the liquid properly stirred and ready for use.

Another object of the invention is the provision of means for introducing liquid into the liquid compartment or container without the necessity of opening the same.

Another object of the invention is to provide a liquid container in which the liquid is located between inner and outer ice containers, so as to properly cool the liquid.

Another object of the invention is the provision of a dispensing apparatus which in addition to the above and other advantages, is simple in construction and may be readily taken apart and reassembled for cleaning or repair.

With the above and other objects in view, the invention further includes the following novel features and details of construction, to be hereinafter more fully described, illustrated in the accompanying drawings and pointed out in the appended claims.

In the drawings:—

Figure 1:
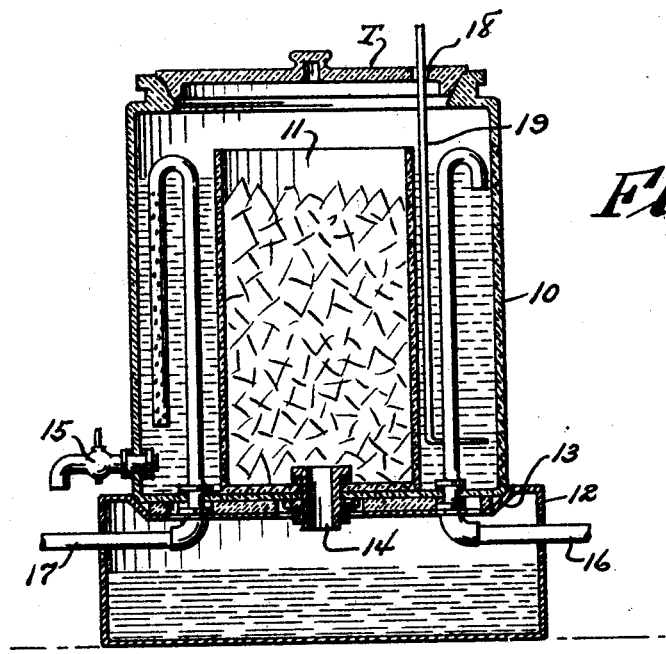
Figure 1 is a sectional view of a liquid container constructed in accordance with the invention.

Referring to the drawings in detail wherein like characters of reference denote corresponding parts, the reference character 10 indicates a container which is preferably made of glass or other transparent material and in which is positioned a similar container 11. The containers 10 and 11 are concentrically arranged and are supported upon a container 12, which forms a base for the containers 10 and 11.

The container 12 is provided with a recess or depression 13 in its top to receive the container 10, while a nipple 14 extends through all of the containers and has a water tight connection therewith, after the manner of the connection in the patent previously referred to. The container 10 is adapted to contain liquid to be dispensed while the container 11 is adapted to contain ice to cool the liquid, and water from the ice will drain into the container 12, from where it may be removed by means of a suitable drain cock. A spigot 15 is provided for removing the liquid from the container 10. The container 10 is provided with a removable cover T, which also forms a cover for the ice container 11.

Extending through the container 12 is a pipe 16. This pipe extends upwardly into the container 10 and is adapted to have its outer end connected with a suitable source of liquid supply, so that liquid may be forced in the container 10 without removing the cover T and permitting of the escape of cold air.

An additional pipe 17 extends through the container 12 into the container 10 and this pipe is adapted to be connected to a suitable source of pressure, the purpose being to keep the liquid within the container 10 agitated, or stirred up and have it at all times ready for use. This is especially desirable in certain characters of liquid.

Extending through an opening 18 provided in the top 16 is an agitator element 19 which is designed to be manually operated to agitate the liquid in case it is not desired to use air pressure.

Figure 2:
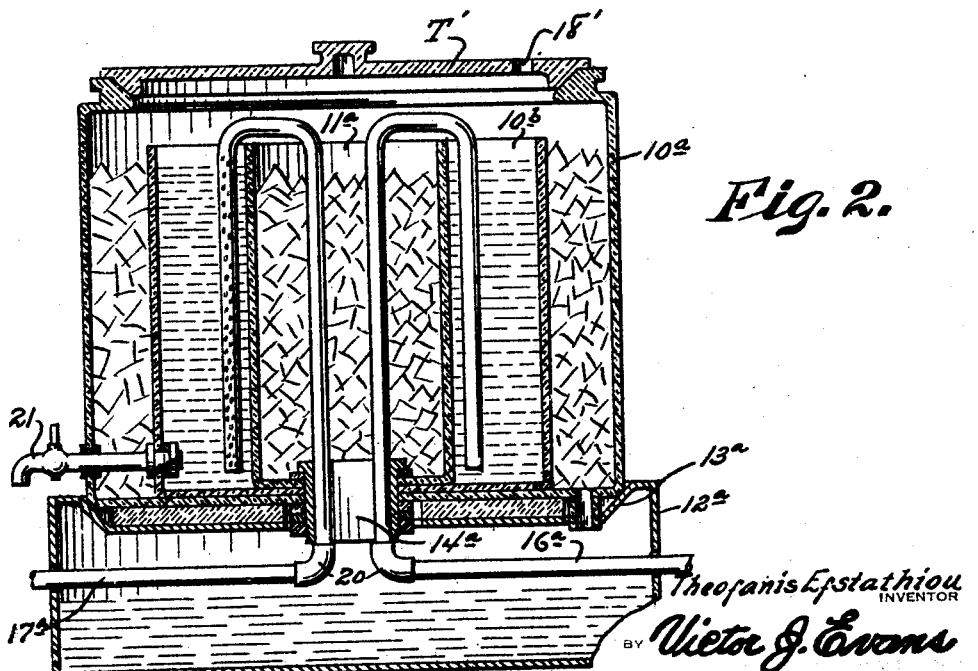
Figure 2 is a like view showing a modified form of the invention.

In the form of the invention illustrated in Figure 2, the apparatus is substantially the same except that the container 10$^a$ encloses both a liquid container 10$^b$ and an ice container 11$^a$. These containers are concentrically arranged, so that the liquid within the container 10$^b$ is subjected to the cooling action of ice around its outside, as well as upon the inside. It is of course obvious that either the outside ice container 10$^a$ or the inside ice container 10$^b$ may be dispensed with, as the containers are removably secured together by a nipple connection 14$^a$ similar to the connection 14.

In the construction disclosed in Figure 2, the pipes 16$^a$ and 17$^a$ extend up through the nipple 14$^a$. These pipes are of sectional formation with the sections connected by elbows 20, so that in taking the apparatus apart, these pipe sections may be removed.

The cover T' extends across the containers, so that all three of the containers are covered thereby. The cover T' is provided with an opening 18' for the use of a manually operated agitator if desired.

A spigot 21 extends from the container 10$^b$ through the outer wall of the container 10$^a$ for dispensing liquid.

As in the form of the invention disclosed in the patent referred to, it will be apparent that should the container 12 or the container 12ª overflow, the water will back up into the central container 11 or 11ª and may be readily seen through the transparent walls of the containers.

It is of course apparent that a suitable refrigerator coil may be substituted for the ice in the ice containers.

The invention is susceptible of various changes in its form, proportions and minor details of construction and the right is herein reserved to make such changes as properly fall within the scope of the appended claims.

If desired, the pipe 17 may be provided with a number of air escape openings, so that pressure will be distributed throughout the depth of the liquid.

In addition to supplying air for agitating the liquid, the pipes 17 and 17ª may be connected with a supply of heated air so as to heat the liquid and at the same time keep the liquid agitated. Of course, when hot air is supplied to the liquid, the use of ice will be dispensed with.

Having described the invention what is claimed is:—

1. A device of the class described comprising an inner and outer container, a container forming a base for the inner and outer containers and communicating with the inner container, a pipe extending through the base container and through the center and base container communicating means and having its inner end extending over the top of the inner container into the outer container to provide means for introducing air under pressure to the contents of the outer container.

2. A device of the class described comprising inner and outer containers, a container forming a base for the inner and outer containers and communicating with the inner container, a pipe extending through the base container and through the center and base container communicating means and having its inner end extending over the top of the inner container into the outer container to provide means for introducing air under pressure to the contents of the outer container and a similarly arranged pipe to introduce liquid into the container.

3. A device of the class described comprising inner and outer containers, a container forming a base for the inner and outer containers, a removable nipple extending from the inner container into the base and providing communication, a pipe extending through the base container, through said nipple into the inner container and having its inner end extending over the top of said inner container into the outer container and a faucet for the outer container.

In testimony whereof I affix my signature.

THEOFANIS EFSTATHIOU.